United States Patent
Carter

(10) Patent No.: US 8,412,438 B2
(45) Date of Patent: Apr. 2, 2013

(54) DUAL STATE LIQUEFIED PETROLEUM GAS ENGINE ASSEMBLY

(75) Inventor: Nicholas Carter, Fairfield (AU)

(73) Assignee: GM Global Technology Operations LLC

( * ) Notice: Subject to any disclaimer, the term of this patent is extended or adjusted under 35 U.S.C. 154(b) by 737 days.

(21) Appl. No.: 12/638,115

(22) Filed: Dec. 15, 2009

(65) Prior Publication Data

US 2011/0144886 A1    Jun. 16, 2011

(51) Int. Cl.
*F02D 41/00* (2006.01)
*F02B 43/00* (2006.01)
*F02M 69/46* (2006.01)
*F28D 15/00* (2006.01)

(52) U.S. Cl. .......................... 701/103; 123/527

(58) Field of Classification Search ................... 123/456, 123/527; 701/103, 104; 165/104.19
See application file for complete search history.

(56) References Cited

U.S. PATENT DOCUMENTS

| 4,421,087 | A | | 12/1983 | Schuurman | |
|---|---|---|---|---|---|
| 4,463,735 | A | * | 8/1984 | Stoltman | 123/525 |
| 4,483,302 | A | * | 11/1984 | Mannessen | 123/527 |
| 5,887,574 | A | | 3/1999 | Smith | |
| 6,216,675 | B1 | * | 4/2001 | Bennett | 123/541 |
| 7,299,794 | B2 | | 11/2007 | Sexton | |

FOREIGN PATENT DOCUMENTS

| CN | 2325621 Y | 6/1999 |
|---|---|---|
| JP | 2009191855 A | 8/2009 |

* cited by examiner

*Primary Examiner* — Stephen K Cronin
*Assistant Examiner* — Arnold Castro
(74) *Attorney, Agent, or Firm* — Harness, Dickey & Pierce, P.L.C.

(57) ABSTRACT

An engine assembly may include an engine structure, an intake manifold, and a liquefied petroleum gas (LPG) fuel assembly. The engine structure may define a combustion chamber and the intake manifold may be in communication with the combustion chamber. The LPG fuel assembly may include a LPG fuel tank containing LPG fuel, a liquid LPG fuel injection system in communication with the LPG fuel tank and the combustion chamber, and a vapor LPG fuel injection system in communication with the LPG fuel tank and the intake manifold.

17 Claims, 2 Drawing Sheets

DUAL STATE LIQUEFIED PETROLEUM GAS ENGINE ASSEMBLY

FIELD

The present disclosure relates to engine assemblies, and more specifically to dual state liquefied petroleum gas engine assemblies.

BACKGROUND

The statements in this section merely provide background information related to the present disclosure and may not constitute prior art.

Liquefied petroleum gas (LPG) engine assemblies may include a fuel rail attached to fuel injectors that inject liquid fuel into a combustion chamber or into an injection port in communication with the combustion chamber. LPG engine assemblies may also include a fuel pump that circulates fuel from a fuel tank through the fuel rail. In warm conditions, fuel in the fuel rail may be heated to a vapor state. Thus, the fuel pump may circulate fuel through the fuel rail prior to engine startup to purge fuel vapor in the fuel rail. This purge of fuel vapor in the fuel rail may increase the time required for engine startup.

During a fuel tank fill event, the temperature and pressure of the fuel tank may be elevated. An elevated tank pressure may increase a fill pressure and/or a fill time required to fill the fuel tank with fuel.

SUMMARY

A liquefied petroleum gas (LPG) fuel assembly may include a liquid LPG fuel injection system and a vapor LPG fuel injection system. The liquid LPG fuel injection system may be in communication with a LPG fuel tank and a combustion chamber of an engine. The vapor LPG fuel injection system may be in communication with the LPG fuel tank and an intake manifold of the engine.

An engine assembly may include an engine structure, an intake manifold, and a LPG fuel assembly. The engine structure may define a combustion chamber and the intake manifold may be in communication with the combustion chamber. The LPG fuel assembly may include a LPG fuel tank containing LPG fuel, a liquid LPG fuel injection system in communication with the LPG fuel tank and the combustion chamber, and a vapor LPG fuel injection system in communication with the LPG fuel tank and the intake manifold.

A method may include providing vapor LPG fuel from a vaporizer in communication with a LPG fuel tank to an intake manifold of an engine during a first operating condition, and providing liquid LPG fuel from the LPG fuel tank to a combustion chamber of the engine during a second operating condition.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
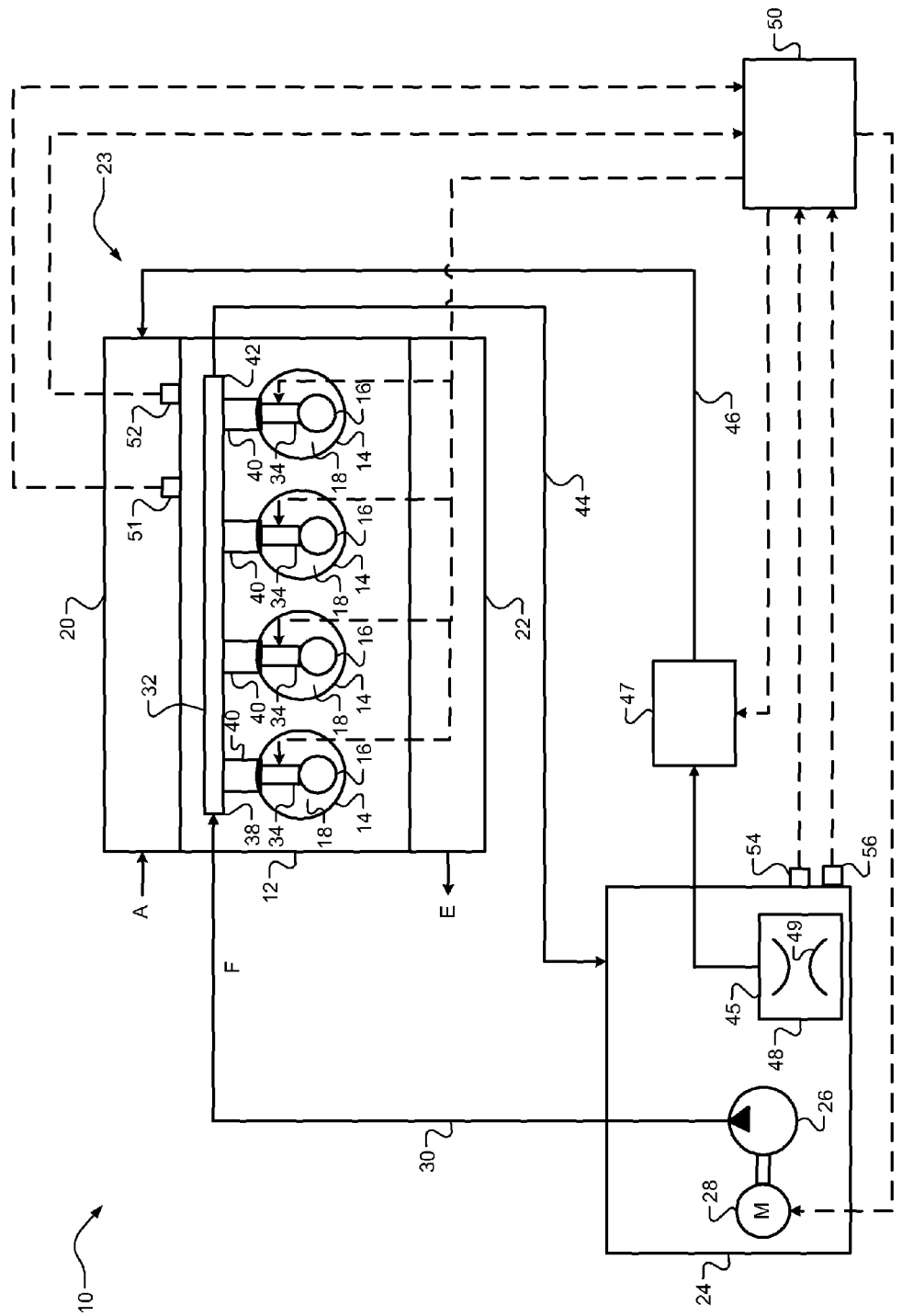
Figure 2:
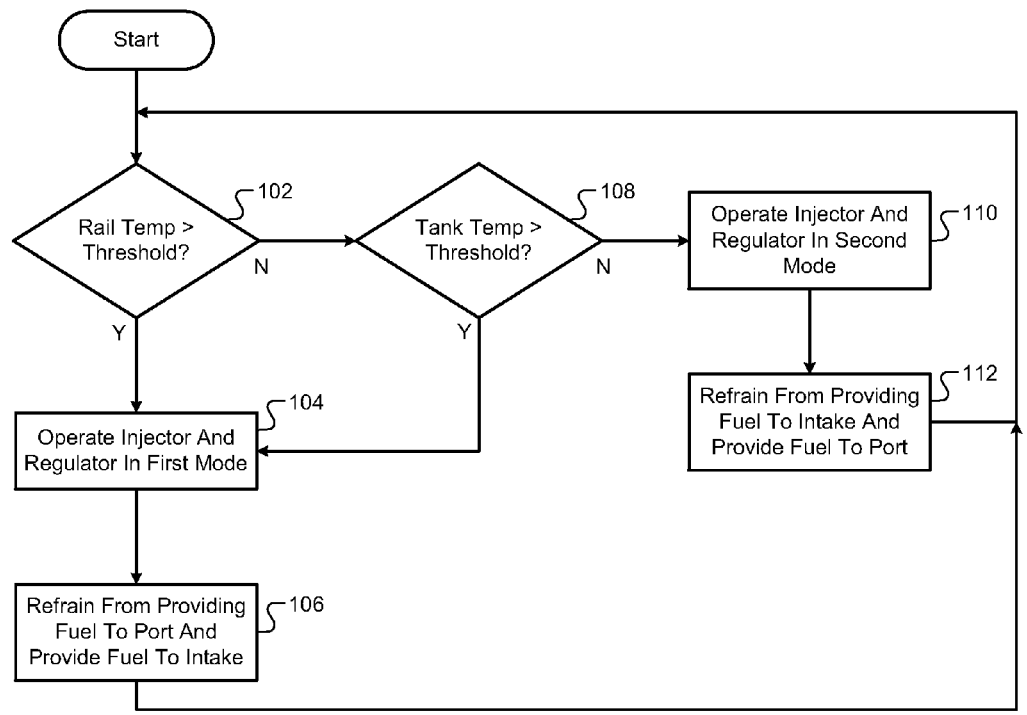

FIG. 1 is a schematic illustration of an engine assembly according to the present disclosure; and FIG. 2 is a flowchart illustrating operation of the engine assembly according to the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may form a liquefied petroleum gas (LPG) engine assembly including an engine structure 12 defining cylinder bores 14 and injection ports 16, pistons 18, an intake manifold 20, an exhaust manifold 22, and a fuel assembly 23. The engine structure 12 may include an engine block that defines the cylinder bores 14 and a cylinder head that defines the injection ports 16. While the engine assembly 10 is illustrated as including an inline four cylinder engine, it is understood that the present disclosure applies equally to engines having any number of cylinders and arrangements including, but not limited to, inline and V-engines.

The pistons 18 may be disposed within the cylinder bores 14 for reciprocal displacement therein. The intake manifold 20 may be in communication with the cylinder bores 14 to provide airflow (indicated by arrow A) into the cylinder bores 14. The exhaust manifold 22 may be in communication with the cylinder bores 14 to transport exhaust gases (indicated by arrow E) away from the cylinder bores 14.

The fuel assembly 23 may form a LPG fuel assembly including a fuel tank 24, a fuel pump 26, a motor 28, a first fuel supply line 30, a fuel rail 32, fuel injectors 34, a fuel return line 44, a vaporizer 45, a second fuel supply line 46, and a flow control device 47. The fuel pump 26 and the motor 28 may be located in the fuel tank 24. The fuel tank 24 may form an LPG tank and may store LPG therein. The fuel pump 26 may be driven by the motor 28 and may generate a fuel flow (indicated by arrow F) from the fuel tank 24 through the first fuel supply line 30.

The fuel pump 26, the motor 28, the first fuel supply line 30, the fuel rail 32, the fuel injectors 34, and the fuel return line 44 may form a liquid LPG fuel injection system. The fuel rail 32 may include an inlet 38 in communication with the first fuel supply line 30, injection passageways 40 in communication with the inlet 38, and an outlet 42 in communication with the injection passageways 40. The fuel rail 32 may receive fuel flow from the fuel pump 26 and distribute fuel to the fuel injectors 34 through the injection passageways 40. The fuel injectors 34 may provide fuel to the cylinder bores 14. By way of non-limiting example, the fuel injectors 34 may inject fuel directly into the cylinder bores 14. Alternatively, the fuel injectors 34 may inject fuel into the injection ports 16 and reciprocal movement of the pistons 18 within the cylinder bores 14 may create a vacuum that draws the fuel from the injection ports 16 into the cylinder bores 14. The fuel return line 44 may be in communication with the outlet 42 and the fuel tank 24 and may return fuel from the fuel rail 32 to the fuel tank 24.

The vaporizer 45, the second fuel supply line 46, and the flow control device 47 may form a vapor LPG fuel injection system. The vaporizer 45 may be disposed within and in communication with the fuel tank 24. The second fuel supply line 46 may be in communication with the vaporizer 45 and the intake manifold 20. The flow control device 47 may be in communication with and located between the vaporizer 45 and the intake manifold 20. By way of non-limiting example, the flow control device 47 may be located between the vaporizer 45 and the second fuel supply line 46, between the second fuel supply line 46 and the intake manifold 20, or within the second fuel supply line 46.

The vaporizer 45 may transform fuel exiting the fuel tank 24 from liquid to vapor as fuel passes through the vaporizer 45. The vaporizer 45 may include a pressure reducing structure 48 that decreases the pressure of fuel passing through the vaporizer 45 from a tank pressure to a vapor pressure to transform fuel passing through the vaporizer 45 from liquid to vapor. The pressure reducing structure 48 may include an orifice, a nozzle, and/or a mechanical valve such as a ball valve or a needle valve. The tank pressure may vary based on a fuel temperature and a type of fuel contained in the fuel tank 24. By way of non-limiting example, the tank pressure may range from 350 kPa to 1,400 kPa when the fuel temperature ranges from −10 degrees Celsius to 40 degrees Celsius and the type of fuel contained in the fuel tank 24 is propane. Also by way of non-limiting example, the vapor pressure may be less than 1,200 kPa, and more specifically the vapor pressure may be approximately 300 kPa.

The vaporizer 45 may include a heat conducting structure 49 that absorbs heat from fuel within the fuel tank 24 to transform fuel in the vaporizer 45 from liquid to vapor. The heat conducting structure 49 may include a casing and/or a heat exchanger such as a tube and fin heat exchanger, a plate fin heat exchanger or a shell and tube heat exchanger. The vaporizer 45 may be located at the bottom of the fuel tank 24, as the concentration of liquid fuel may be higher at the bottom of the fuel tank 24 relative to the top of the fuel tank 24.

The flow control device 47 may provide fuel vapor from the vaporizer 45 to the intake manifold 20. As the flow control device 47 allows fuel to pass through, the pressure drop from the fuel tank 24 to the intake manifold 20 may cause fuel to flow from the fuel tank 24, through the vaporizer 45 and the flow control device 47, and to the intake manifold 20. The flow control device 47 may distribute fuel from the vaporizer 45 into air supplied to the intake manifold 20. By way of non-limiting example, the flow control device 47 may distribute fuel into air entering the intake manifold 20 through the second fuel supply line 46. Alternatively, the flow control device 47 may be attached to the intake manifold 20 to distribute fuel directly into the intake manifold 20.

By way of non-limiting example, the flow control device 47 may include an electronic fuel injector. Alternatively, the flow control device 47 may include a mixer mounted to the intake manifold 20. In this aspect, a venturi effect may be created through an air valve in the flow control device 47 as air enters the intake manifold 20. The venturi effect may cause a pressure drop that acts on a spring-loaded diaphragm in the flow control device 47 to distribute fuel in proportion to the amount of air flowing through the intake manifold 20.

The engine assembly 10 may further include a control module 50, a coolant temperature sensor 51, an oil temperature sensor 52, a fuel tank temperature sensor 54, and a fuel tank pressure sensor 56. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. The control module 50 may control operation of the motor 28, the fuel injectors 34, and the flow control device 47. By way of non-limiting example, the control module 50 may control operation of the motor 28, the fuel injectors 34, and the flow control device 47 via pulse width modulation (PWM) of signals sent thereto.

The coolant temperature sensor 51 and the oil temperature sensor 52 may provide signals to the control module 50 that respectively indicate the temperature of oil in the engine structure 12 and the temperature of coolant in the engine structure 12. The fuel tank temperature sensor 54 and the fuel tank pressure sensor 56 may provide signals to the control module 50 that respectively indicate the temperature of fuel in the fuel tank 24 and the pressure of fuel in the fuel tank 24.

Operation of the fuel assembly 23 is illustrated in the control logic shown in FIG. 2. Control module 50 may determine whether the temperature of the fuel rail 32 is greater than a rail temperature threshold in step 102 when engine startup is initiated. The rail temperature threshold may be the temperature at which fuel in the fuel rail 32 transitions from liquid to vapor. The rail temperature threshold may be predetermined using development testing.

Control module 50 may determine the temperature of the fuel rail 32 based on the coolant temperature from coolant temperature sensor 51, the oil temperature from oil temperature sensor 52, and an engine-off period. The engine-off period may be a period of time during which the engine assembly 10 is shut off. Control module 50 may determine the temperature of the fuel rail 32 based on a predetermined relationship between the coolant and oil temperatures when the engine assembly 10 is initially shut off, the engine-off period, and the temperature of the fuel rail 32.

Control module 50 may operate the fuel injectors 34 and the flow control device 47 in a first mode in step 104 when the temperature of the fuel rail 32 is greater than the rail temperature threshold. The fuel injectors 34 may refrain from providing liquid fuel to the injection ports 16 and the flow control device 47 may provide fuel vapor to the intake manifold 20 in step 106 when operating in the first mode. The flow control device 47 may provide a flow path from the vaporizer 45 to the intake manifold 20 when operating in the first mode. Control module 50 may continue to operate the fuel injectors 34 and the flow control device 47 in the first mode while the temperature of the fuel rail 32 is greater than the rail temperature threshold.

The vaporizer 45 may convert liquid fuel in the fuel tank 24 to vapor when the flow control device 47 draws fuel through the vaporizer 45 by allowing fuel to travel from the fuel tank 24 to the intake manifold 20. The vaporizer 45 may absorb heat from within the fuel tank 24 as fuel flows through and is vaporized by the vaporizer 45. The heat absorbed may be equal to the heat of vaporization required to transform the fuel flow from liquid to vapor. Thus, the flow control device 47 may decrease the temperature of the fuel tank 24 by allowing liquid fuel in the fuel tank 24 to flow through the vaporizer 45.

In this manner, a dual state LPG engine assembly is provided that enables engine operation using a vapor LPG fuel injection system while fuel vapor is purged from a liquid LPG fuel injection system. Enabling engine operation while fuel vapor is purged from the liquid LPG fuel injection system may reduce the time required for engine startup during a hot start (i.e., engine startup when ambient temperatures are hot).

Control module 50 may determine whether the temperature of the fuel tank 24 is greater than a tank temperature threshold in step 108. The tank temperature threshold may be a maximum temperature of the fuel tank 24 resulting in a fill pressure and/or a fill time that satisfies industry standards. The tank temperature threshold may be predetermined using development testing.

Control module 50 may operate the fuel injectors 34 and the flow control device 47 in the first mode in step 104 when the temperature of the fuel tank 24 is greater than the tank temperature threshold. As discussed above, the fuel injectors 34 may refrain from providing liquid fuel to the injection ports 16 and the flow control device 47 may provide fuel vapor to the intake manifold 20 in the first mode. Control module 50 may continue to operate the fuel injectors 34 and the flow control device 47 in the first mode while the temperature of the fuel tank 24 is greater than the tank temperature threshold.

In this manner, the LPG engine assembly of the present disclosure may decrease the temperature of a fuel tank, thereby decreasing the pressure of the fuel tank. Decreasing the pressure of the fuel tank may reduce the fill pressure and/or the fill time required to fill the fuel tank with fuel.

Control module 50 may transition the fuel injectors 34 and the flow control device 47 from operating in the first mode to operating in the second mode in step 110 when the temperature of the fuel tank 24 is less than or equal to the tank temperature threshold. The fuel injectors 34 may provide fuel to the injection ports 16 and the flow control device 47 may refrain from providing fuel to the intake manifold 20 in step 112 when operating in the second mode. Control module 50 may continue to operate the fuel injectors 34 and the flow control device 47 in the second mode the temperature of the fuel rail 32 and the temperature of the fuel tank 24 are less than or equal to the rail temperature threshold and the tank temperature threshold, respectively.

In this manner, the LPG engine assembly of the present disclosure may transition from the vapor LPG fuel injection system to the liquid LPG fuel injection system when fuel vapor is purged from a fuel rail. During this transition, an engine may run on fuel vapor only, liquid fuel only, or a combination thereof. By way of non-limiting example, fuel supplied to the engine may be 100% vapor and 0% liquid, 0% vapor and 100% liquid, and any percentages of vapor and liquid therebetween. This transition may be executed using methods similar to those employed when an evaporative emission (EVAP) system releases collected fuel vapors into an intake manifold for burning.

Moreover, an engine may run continuously on a blend of fuel vapor and liquid fuel. This may occur when a fuel flow through the liquid LPG fuel injection system is initiated to decrease the temperature of a fuel tank.

What is claimed is:

1. A liquefied petroleum gas (LPG) fuel assembly comprising:
   a liquid LPG fuel injection system in communication with a LPG fuel tank and a combustion chamber of an engine wherein the liquid LPG fuel injection system includes a fuel injector in communication with the LPG fuel tank and in direct communication with the combustion chamber; and
   a vapor LPG fuel injection system in communication with the LPG fuel tank and an intake manifold of the engine.

2. A liquefied petroleum gas (LPG) fuel assembly comprising:
   a liquid LPG fuel injection system in communication with a LPG fuel tank and a combustion chamber of an engine;
   wherein the liquid LPG fuel injection system includes a fuel injector in communication with the LPG fuel tank and in direct communication with the combustion chamber;
   a vapor LPG fuel injection system in communication with the LPG fuel tank and an intake manifold of the engine;
   wherein the liquid LPG fuel injection system includes:
   a LPG fuel pump in communication with the LPG fuel tank; and
   a LPG fuel rail in communication with the LPG fuel pump and the fuel injector, wherein the LPG fuel pump is operable to provide liquid LPG fuel from the LPG fuel tank to the LPG fuel rail.

3. The LPG fuel assembly of claim 1, wherein the vapor LPG fuel injection system includes:
   a vaporizer in communication with the LPG fuel tank; and
   a flow control device located between and in communication with the vaporizer and the intake manifold, the fuel assembly operable in a first mode in which the flow control device provides communication between the vaporizer and the intake manifold and a second mode in which the fuel injector provides liquid LPG to the combustion chamber.

4. The LPG fuel assembly of claim 3, wherein the flow control device provides a flow path from the vaporizer to the intake manifold during the first mode and a pressure drop from the vaporizer to the intake manifold provides flow of vapor LPG from the vaporizer to the intake manifold.

5. The LPG fuel assembly of claim 4, wherein the vaporizer includes a pressure reducing structure that decreases a LPG fuel pressure as LPG fuel flows through the vaporizer to transform LPG fuel from a liquid state to a vapor state.

6. The LPG fuel assembly of claim 5, wherein the vaporizer is located within the LPG fuel tank and includes a heat conducting structure that absorbs heat from liquid LPG fuel within the LPG fuel tank to transform liquid LPG fuel in the vaporizer from the liquid state to the vapor state.

7. An engine assembly comprising:
   an engine structure defining a combustion chamber;
   an intake manifold in communication with the combustion chamber; and
   a liquefied petroleum gas (LPG) fuel assembly including:
   a LPG fuel tank containing LPG fuel;
   a liquid LPG fuel injection system in communication with the LPG fuel tank and the combustion chamber wherein the liquid LPG fuel injection system includes a fuel injector in communication with the LPG fuel tank and in direct communication with the combustion chamber; and
   a vapor LPG fuel injection system in communication with the LPG fuel tank and the intake manifold.

8. An engine assembly comprising:
   an engine structure defining a combustion chamber;
   an intake manifold in communication with the combustion chamber; and
   a liquefied petroleum gas (LPG) fuel assembly including:
   a LPG fuel tank containing LPG fuel;
   a liquid LPG fuel injection system in communication with the LPG fuel tank and the combustion chamber wherein the liquid LPG fuel injection system includes a fuel injector in communication with the LPG fuel tank and the combustion chamber; and
   a vapor LPG fuel injection system in communication with the LPG fuel tank and the intake manifold;
   wherein the liquid LPG fuel injection system includes:
   a LPG fuel pump in communication with the LPG fuel tank; and
   a LPG fuel rail in communication with the LPG fuel pump and the fuel injector, wherein the LPG fuel pump is operable to provide liquid LPG fuel from the LPG fuel tank to the LPG fuel rail.

9. The engine assembly of claim 7, wherein the vapor LPG fuel injection system includes:
   a vaporizer in communication with the LPG fuel tank; and
   a flow control device located between and in communication with the vaporizer and the intake manifold, the fuel assembly operable in a first mode in which the flow control device provides communication between the vaporizer and the intake manifold and a second mode in which the fuel injector provides liquid LPG to the combustion chamber.

10. The engine assembly of claim 9, wherein the flow control device provides a flow path from the vaporizer to the intake manifold during the first mode and a pressure drop from the vaporizer to the intake manifold provides flow of vapor LPG from the vaporizer to the intake manifold.

11. The engine assembly of claim 10, wherein the vaporizer includes a pressure reducing structure that decreases a LPG fuel pressure as LPG fuel flows through the vaporizer to transform LPG fuel from a liquid state to a vapor state.

12. The engine assembly of claim 11, wherein the vaporizer is located within the LPG fuel tank and includes a heat conducting structure that absorbs heat from liquid LPG fuel within the LPG fuel tank to transform liquid LPG fuel in the vaporizer from the liquid state to the vapor state.

13. A method comprising:
providing vapor LPG fuel from a vaporizer in communication with a LPG fuel tank to an intake manifold of an engine during a first operating condition; and
providing liquid LPG fuel from the LPG fuel tank to a combustion chamber of the engine during a second operating condition;
wherein the providing liquid LPG fuel includes distributing LPG fuel to a fuel injector via a fuel rail and injecting liquid LPG fuel into the combustion chamber via the fuel injector during the second operating condition.

14. The method of claim 13, further comprising controlling the vapor LPG fuel flow to the intake manifold using a flow control device located between the LPG fuel tank and the intake manifold.

15. The method of claim 14, further comprising reducing a temperature within the LPG fuel tank by transferring heat from within the LPG fuel tank to the vaporizer to transform liquid LPG to vapor LPG during the first operating condition.

16. The method of claim 13, wherein the first operating condition includes a fuel rail temperature being greater than a rail temperature threshold indicative of a LPG fuel transition from a liquid state to a vapor state.

17. The method of claim 16, wherein the second operating condition includes the fuel rail temperature being less than or equal to the rail temperature threshold.

* * * * *